United States Patent [19]
Yamamoto et al.

[11] Patent Number: 5,670,952
[45] Date of Patent: Sep. 23, 1997

[54] DATA COMMUNICATION UNIT

[75] Inventors: Shinji Yamamoto; Hideyuki Tayama; Shuji Yamaguchi, all of Kawasaki, Japan

[73] Assignee: Fujitsu Limited, Kawasaki, Japan

[21] Appl. No.: 378,103

[22] Filed: Jan. 26, 1995

Related U.S. Application Data

[63] Continuation of Ser. No. 921,588, Jul. 30, 1992, abandoned.

[30] Foreign Application Priority Data

| Aug. 2, 1991 | [JP] | Japan | 3-193792 |
| Jan. 10, 1992 | [JP] | Japan | 4-002843 |
| Jan. 31, 1992 | [JP] | Japan | 4-015862 |

[51] Int. Cl.$^6$ ........................ H04Q 1/00
[52] U.S. Cl. ........ 340/825.52; 364/708.1; 361/732; 439/378
[58] Field of Search ............. 340/825.52; 364/709.4, 364/708.1; 361/686, 730, 731, 732; 439/378

[56] References Cited

U.S. PATENT DOCUMENTS

| 4,530,069 | 7/1985 | Desrochers | 364/708.1 |
| 4,680,674 | 7/1987 | Moore | 364/708.1 |
| 4,734,874 | 3/1988 | Hwang | 364/708.1 |
| 4,773,032 | 9/1988 | Uehara et al. | 364/709.4 |
| 5,287,098 | 2/1994 | Janssen | 340/825.31 |

FOREIGN PATENT DOCUMENTS

| 0 161 798 | 11/1985 | European Pat. Off. |  |
| 53-136931 | 11/1978 | Japan . |  |
| 59-105118 | 6/1984 | Japan . |  |
| 59-105188 | 6/1984 | Japan . |  |
| 105118 | 6/1984 | Japan | 439/378 |
| 62-47243 | 2/1987 | Japan . |  |
| 2138221 | 10/1984 | United Kingdom | 439/378 |
| 2 170 066 | 7/1986 | United Kingdom . |  |

OTHER PUBLICATIONS

*Patent Abstracts Of Japan*, Vol. 9, No. 23 (E–293), Jan. 30, 1985 & JP-A-59 168747 (Canon), Sep. 22, 1984.

*Patent Abstracts Of Japan*, Vol. 13, No. 2 (E–700), Jan. 6, 1989 & JP-A-63 214038 (Matsushita Electric ), Sep. 6, 1988.

*Primary Examiner*—Brian Zimmerman
*Attorney, Agent, or Firm*—Staas & Halsey

[57] ABSTRACT

A data transmission unit for transmitting data stored in a movable terminal unit to an upper unit when the movable terminal unit is connected to the data transmission unit, includes a coupler for directly coupling the unit to a front or a rear stage data transmission unit without using a connecting cable. The coupler includes data pins for passing data from the movable terminal unit or the front stage data transmission unit to the rear stage data transmission unit or the upper unit, saving the space between adjacent units.

7 Claims, 11 Drawing Sheets

DATA COMMUNICATION UNIT

This application is a continuation of application Ser. No. 07/921,588, filed Jul. 30, 1992, now abandoned.

BACKGROUND OF THE INVENTION

1. Field of the Invention

The present invention relates to a data transmission unit such as a communication interface unit for a hand-held computer, and more particularly to a communication interface unit that is capable of being directly coupled with an adjacent communication interface unit.

In recent years, for canvassing, stock management, etc. and distribution industries, movable terminals such as hand-held computers (hereinafter referred to as HHC) have been widely popularized. When data input to an HHC and stored therein is to be transmitted to a host computer and so forth, the data is transmitted through a data transmission unit such as a communication interface unit (hereinafter referred to as CIU) that is a transmitting adapter. In business offices, for example, there are usually a number of CIUs. A number of HHCs are respectively coupled to the CIUs, and from the CIUs, the data are transmitted to the host computer.

2. Description of the Related Art

In the prior art, each of the CIUs and the host computer are connected by a data cable. Therefore, a space for the data cable is required for each CIU. When there are a number of CIUs, in the prior art, there are a number of cables between the CIUs and the host computer; the said cables of which require space. In addition, if the host computer has only a single connector for connecting the cable to a CIU, each cable must be substituted by another cable when another CIU is to be connected to the host computer. This is an inconvenient operation. When a plurality of CIUs are connected in series, in the prior art, each pair of adjacent CIUs are connected by a data cable, which also requires space for the data cable between adjacent CIUs. Further, in the prior art, a power supply adapter is connected to each of the CIUs. Therefore, the number of power supply adapters is the same as the number of CIUs, which also causes a space problem, and in addition, causes the total system to be expensive.

SUMMARY OF THE INVENTION

Accordingly, an object of the present invention is to reduce the space between two adjacent data transmission units by directly coupling the same.

Another object of the present invention is to supply a current from a single power supply adapter to all data transmission units connected in series so as to reduce the space and cost of the power supply adapter.

Still another object of the present invention is to simplify the connecting operation of data transmission units by directly coupling two adjacent data transmission units without a data cable.

To attain the above objects, there is provided, according to the present invention, a data transmission unit for transmitting data stored in a movable terminal unit to an upper unit when the movable terminal unit is connected to the data transmission unit. The data transmission unit comprises a coupler for directly coupling the data transmission unit to at least one of a front stage data transmission unit and a rear stage data transmission unit without using a connecting cable. The coupler comprises data pins for passing data from one of the movable terminal unit and the front stage data transmission unit to one of the rear stage data transmission unit and the upper unit.

It is preferable that the data transmission unit has side surfaces opposite each other, and the coupler comprises a convex connector including one of the data pins and is provided on one of the surfaces and a concave connector including another one of the data pins and provided on another one of the side surfaces. The convex connector is adapted to be coupled to a convex connector of the front stage data transmission unit, and the concave connector is adapted to be coupled to a convex connector of the rear stage data transmission unit.

Preferably, the data transmission unit comprises a bottom plate and at least one coupling plate provided on the bottom surface. The coupling plate is used to fasten the coupling between the data transmission unit and the front stage data transmission unit or the rear stage data transmission unit.

When a plurality of data transmission units are directly coupled in series by the couplers, only the left-most or the right-most data transmission unit is preferably coupled to the upper unit.

Preferably, the coupler includes power supply pins adapted to be connected to a power supply pin of the front stage data transmission unit and to a power supply pin of one of the upper unit and the rear stage data transmission unit, for transmitting a power supply current.

Preferably, the data transmission unit further comprises a power supply connector that is adapted to connect a power supply adapter to the power supply pins with the power supply adapter generating the power supply current.

Preferably, when a plurality of data transmission units are directly coupled in series by the coupler, only one power supply adapter is connected to the power supply connector in one of the data transmission units, and the other data transmission units are supplied with the power supply current from the single power supply adapter.

Preferably, the data transmission unit further comprises a reverse current preventing element connected between the power supply pins and the power supply connector, to prevent a reverse current from being conducted from one of the power supply pins to the power supply connector.

Preferably, in the data transmission unit, a power supply line is provided between the power supply pins. The data transmission unit further comprises a charging circuit for charging the movable terminal unit, a communication circuit for carrying out communication between the movable terminal unit and the upper terminal, and a voltage regulator for converting the voltage at the power supply line into a voltage suitable for driving the movable terminal unit. The charging circuit, the communication circuit, and the voltage regulator are connected to the power supply line.

Preferably, the data transmission unit further comprises a switching element connected between the power supply line and the voltage regulator, for conducting the power supply current to the voltage regulator only when the data transmission unit is being used.

Preferably, in the data transmission unit, the power supply connector comprises a single-use power input terminal for receiving a small amount of power for driving only a single data transmission unit, and a multiple-use power input terminal for receiving a large amount of power for driving a plurality of data transmission units. The single-use power input terminal is connected to the communication circuit and to the voltage regulator. A first reverse current preventing diode is connected between the power supply pins and the single-use power input terminal, for preventing a reverse current from flowing from the single-use power supply terminal to the power supply pins, and the multiple-use power supply terminal is connected through the first reverse current preventing diode to the communication circuit. The reverse current preventing element preferably comprises a second reverse current preventing diode connected between the multiple-use power supply terminal and the power supply line for preventing a reverse current from flowing from the power supply line to the multiple-use power supply terminal, and a third reverse current preventing diode connected between the single-use power supply terminal and the power supply line through the first reverse current preventing diode for preventing a reverse current from flowing from the power supply line to the single-power supply terminal.

Preferably, the movable terminal is a hand-held computer, and the data transmission unit is a communication interface unit.

According to another aspect of the present invention, the data transmission unit does not have a coupler for directly coupling the data transmission unit to at least one of a front stage data transmission unit and a rear stage data transmission unit without using a connecting cable, but instead, has a connector for indirectly connecting the data transmission unit to at least one of the front stage data transmission unit and the rear stage data transmission unit through a connecting cable, while having all of the above described features other than the coupler.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

For a better understanding of the present invention, the prior art will first be described with reference to FIGS. 1 to 6.

Figure 1:
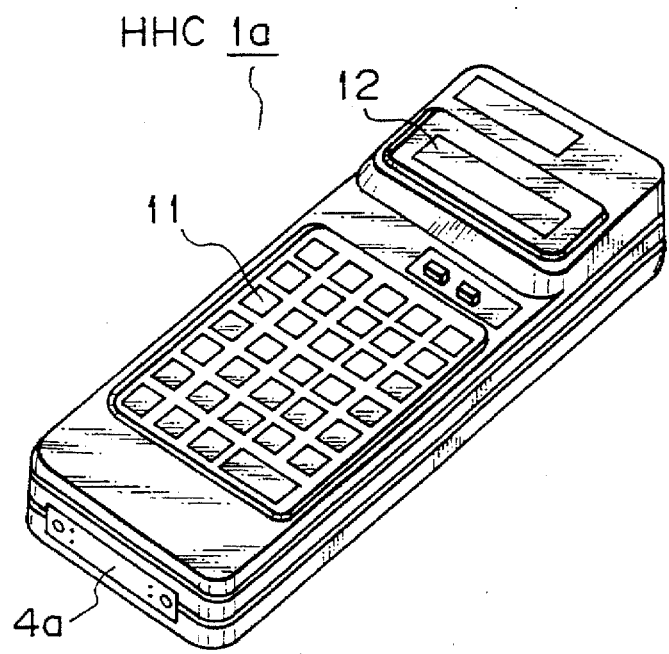
FIG. 1 is a perspective view showing a conventional hand-held computer.

FIG. 1 is a perspective view of a hand-held computer (HHC), which is a movable terminal. As shown in FIG. 1, an HHC 1a is provided with an operating panel 11 and a displaying part 12 on its upper surface, and a light connector 4a with a light emitting element is provided at the rear end surface. The power supply is a battery and the battery is to be charged by a charging circuit in a communication interface unit.

Figure 2:
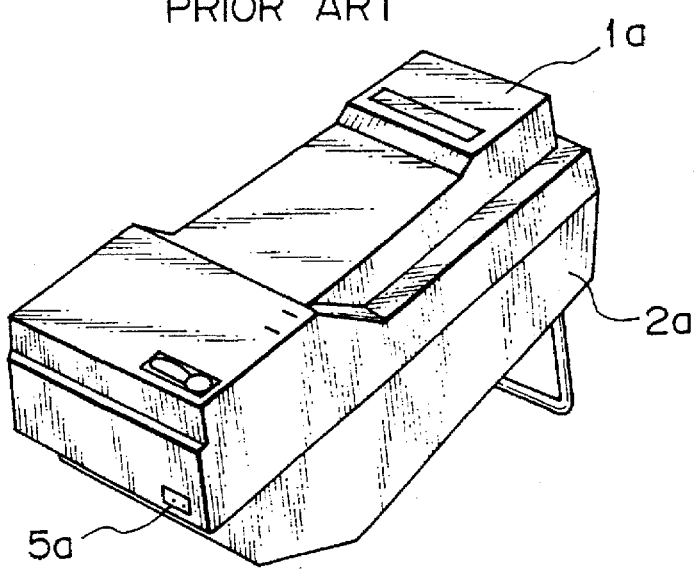
FIG. 2 is a perspective view showing a conventional communication interface unit.

FIG. 2 is a perspective view showing a conventional communication interface unit (CIU), which is a data transmission unit. As shown in FIG. 2, a CIU 2a is provided with a light connector 4b (see FIG. 3) with a light receiving element at a position opposing the light connector 4a when the HHC 1a is mounted on the top surface of the CIU 2a, and a power connector 5a at the rear end surface.

Figure 3:
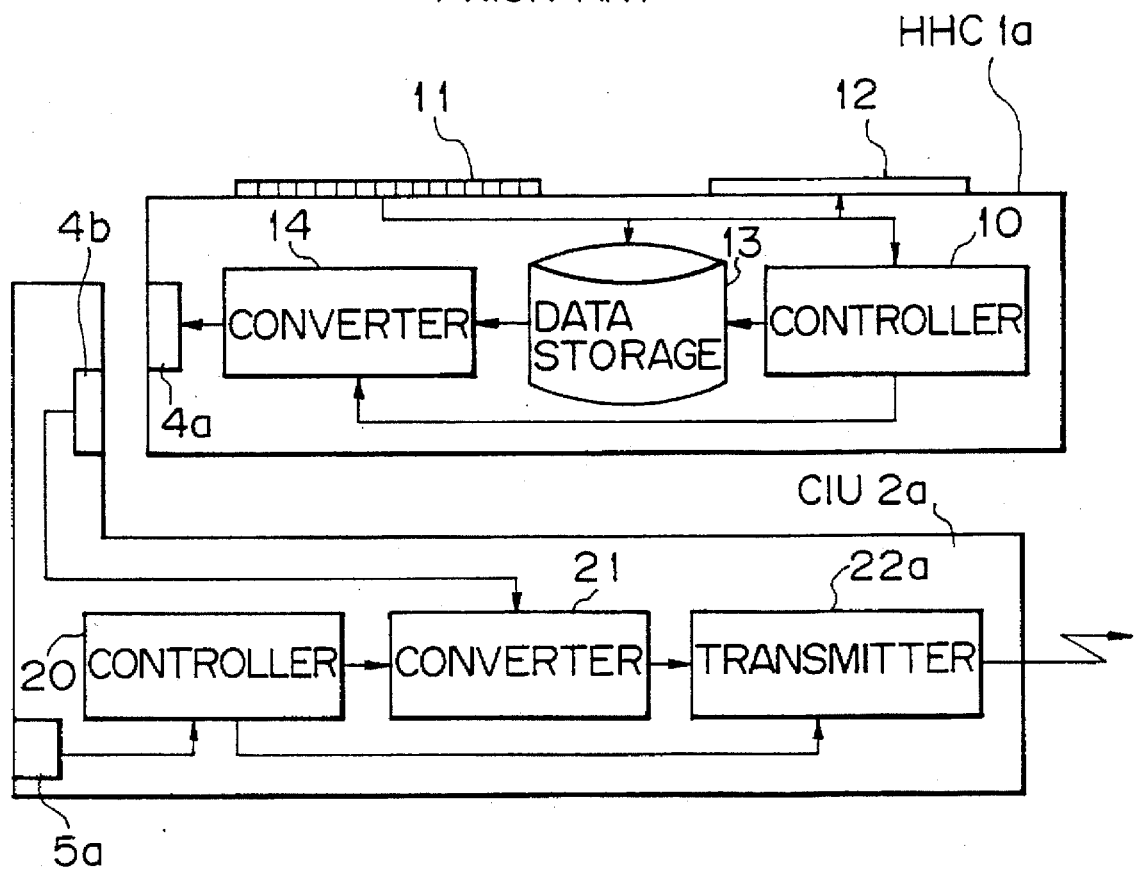
FIG. 3 is a block diagram showing a conventional structure of the hand-held computer and the communication interface unit.

FIG. 3 is a block diagram showing a conventional structure of the hand-held computer and the communication interface unit. As shown in FIG. 3, the HHC 1a includes a control unit 10, a data storage 13, and a converting unit 14. The CIU 2a includes a control unit 20, a converting unit 21, a transmitting unit 22a and the power supply connector 5a.

The operation panel 11 is provided with ten keys for inputting data and operating functions such as transmission instruction function and so forth.

The control unit 10 is provided with a CPU and a control program so that, in response to the input from the operating panel 11, the control program controls each part to perform data accessing, transmission, and so forth. The data storage 13 stores data input from the operating panel 11. The converting unit 14 converts data output from the data memory 13 into light data.

The control unit 20 is provided with a CPU and a control program so that the control program controls each part to perform the transmission of data sent from the HHC 1a. The converting unit 21 converts the light data into transmitting data. The transmitting unit 22a transmits the transmitting data to a host computer which is an upper unit (not shown in FIG. 3).

The operation of data transmission by using the HHC 1a and the CIU 2a is as follows. In general, the transmission of data stored in the HHC 1a may be carried out within an office. However, there are many cases when liaison clerks transmit data from their cars when they are outside.

For example, in an office, when the host computer (here, for example, an office computer) is placed near the CIU 2a, the data input is effected by directly connecting the host computer and the CIU 2a through a connecting cord 23 and by mounting the HHC 1a on the CIU 2a with the light connector 4a being opposite the light connector 4b.

Then, when the transmission instructing button on the operating panel 11 is pressed, the data stored in the data storage 13 is output and is converted into light data by the converting unit 14. The light data is transmitted from the light emitting element to the light receiving element in the light connector 4b. The received light data is converted into transmitting data by the converting unit 21 and is transmitted from the transmitting unit 22a to the host computer.

Figure 4:
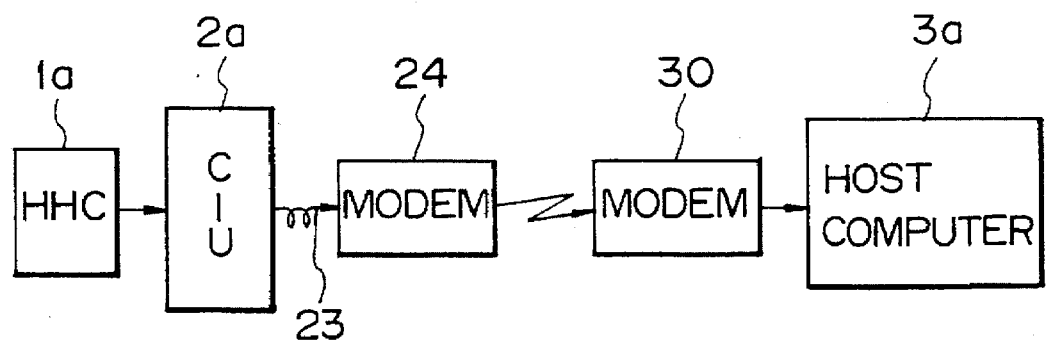
FIG. 4 is a block diagram showing a conventional data transmission system using the hand-held computer and the communication interface unit.

FIG. 4 is a block diagram showing an example of a conventional data transmission system for transmitting data from the CIU 2a to the host computer 3a.

In FIG. 4, reference numerals 24 and 30 represent modems. The CIU 1a is connected through a connecting cord 23 to the modem 24. The transmitting data is transmitted from the modem 24 through a public network or a directly connected private line to the modem 30, which is connected to a host computer 3a.

Instead of transmitting data through the public network or through the directly connected private line to the modems 24 and 30, the data from the CIU 2a may be directly transmitted to the host computer 3a through a connecting cord 23 without passing through the modems 24 and 30.

The CIU 2a may be placed on a desk or hung on a wall.

The problem in the above described prior art is that the connection cord 23 is required. When there are a plurality of pairs of HHCs and CIUs, a plurality of connection cords are necessary. The space for the plurality of connection cords lowers the effective use of the floor in the office. Further, if the host computer has only a single connector for connecting the cable from the CIU, each cable must be substituted by another cable when another CIU is to be connected to the host computer, which is an inconvenient operation.

Similar problems are present with respect to the power supply connecting cords when they are connected to the power supply connectors 5a (see FIG. 3) of the respective CIUs. The problems in the power supply connecting cords in the prior art will be discussed with reference to FIGS. 5 and 6.

Figure 5:
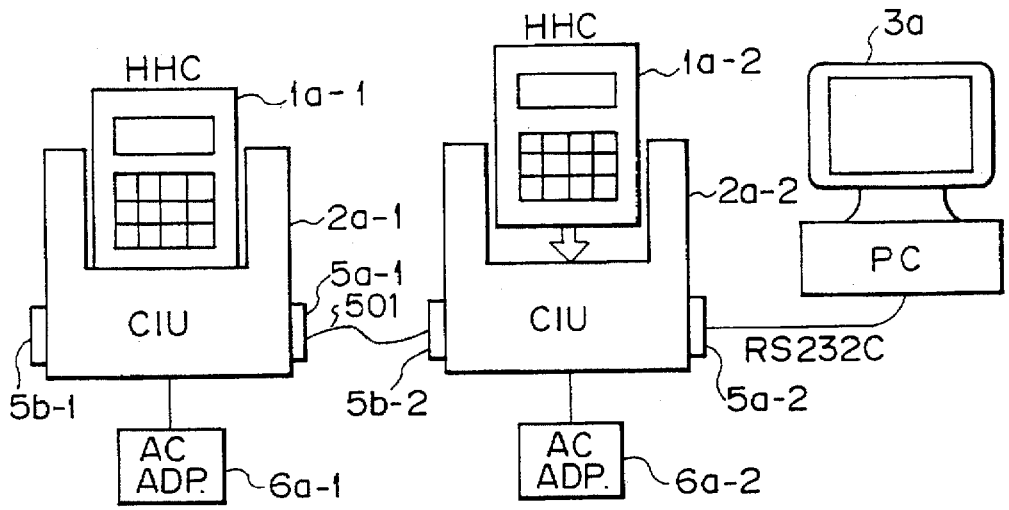
FIG. 5 is a diagram showing a conventional data transmission system when a plurality of communication interface units are connected in series.
Figure 6:
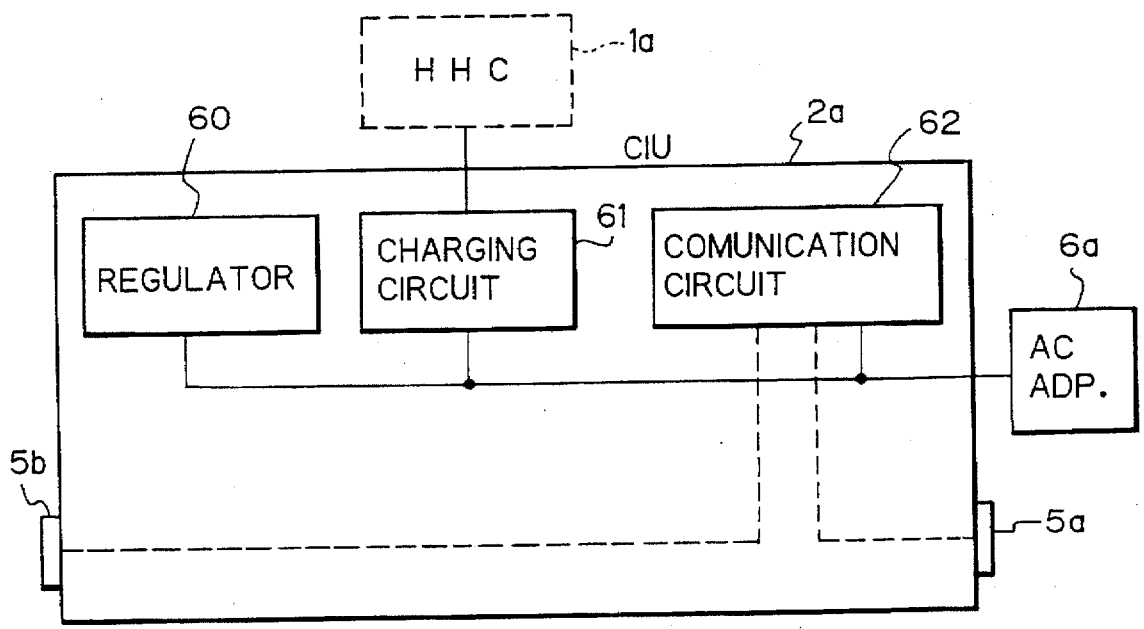
FIG. 6 is a block diagram showing a conventional control unit in the communication interface unit.

FIG. 5 is a diagram showing another conventional data transmission system in which a plurality of communication interface units are connected in series, and FIG. 6 is a block diagram showing a conventional control unit in the communication interface unit.

In FIG. 5, elements 1a-1 and 1a-2 are hand-held computers (HHC); elements 2a-1 and 2a-2 are communication interface units; elements 5a-1 and 5a-2 are external connectors for inputting data from the adjacent CIUs or from the host computer 3a; elements 5b-1 and 5b-2 are external connectors for outputting data to the adjacent CIUs; elements 6a-1 and 6a-2 are power supply adapters; and element 3a is a host computer for communicating with the hand-held computers 1a-1 and 1a-2. The adjacent communication interface units 2a-1 and 2a-2 are connected in series by a data cable 501 in accordance with, for example, the RS232C interface. When there are three or more CIUs, these CIUs are connected in series by data cables. The right-most CIU 2a-2 is connected to the host computer 3a such as a personal computer through, for example, the RS232C interface, for delivering data between the host computer 3a and the hand-held computers 2a-1 and 2a-2.

In FIG. 6, elements 2a is one of the communication interface units 2a-1 and 2a-1 shown in FIG. 5; element 60 is a voltage regulator for providing a driving voltage to the HHC 1a; element 61 is a charging circuit; element 62 is a communicating circuit in accordance with the RS232C interface; and elements 5a and 5b are external connectors.

The charging circuit 61 functions to supply a charging current from an AC power supply adapter 6a to the hand-held computer 1a.

A plurality of communication interface units 2a can be connected through cables, through the external connectors 5a and 5b. The external connector 5b is referred to as an ID (Input Data) connector, and the external connector 5a is referred to as an OD (Output Data) connector. The OD connector 5a of the communication interface unit 2a is connected to the host computer 3a, and its ID connector 5b is connected to the OD connector of the adjacent communication interface unit. Thus, by connecting the communication interface units to each other by cables, access to the host computer 3a is possible from any one of the hand-held computers.

In this example of the prior art, due to the connecting data cable between adjacent CIUs, the area increases in accordance with an increase in the number of CIUs. In addition, in the conventional data transmission system shown in FIG. 5, one power supply adapter 6a is required for one communication interface unit. Each power supply adapter supplies a current for charging each hand-held computer 1a and for communicating with the host computer 3a. Therefore, when multiple communication interface units 2a are connected, the number of power supply adapters 6a must be the same as the number of the communication interface units 2a so that there is a problem in that the construction is very complex and the system becomes very expensive. The area required for the power supply adapters is also a problem.

Now, embodiments of the present invention will be described. Throughout the description, the same reference numbers or symbols represent the same parts.

Figure 7:
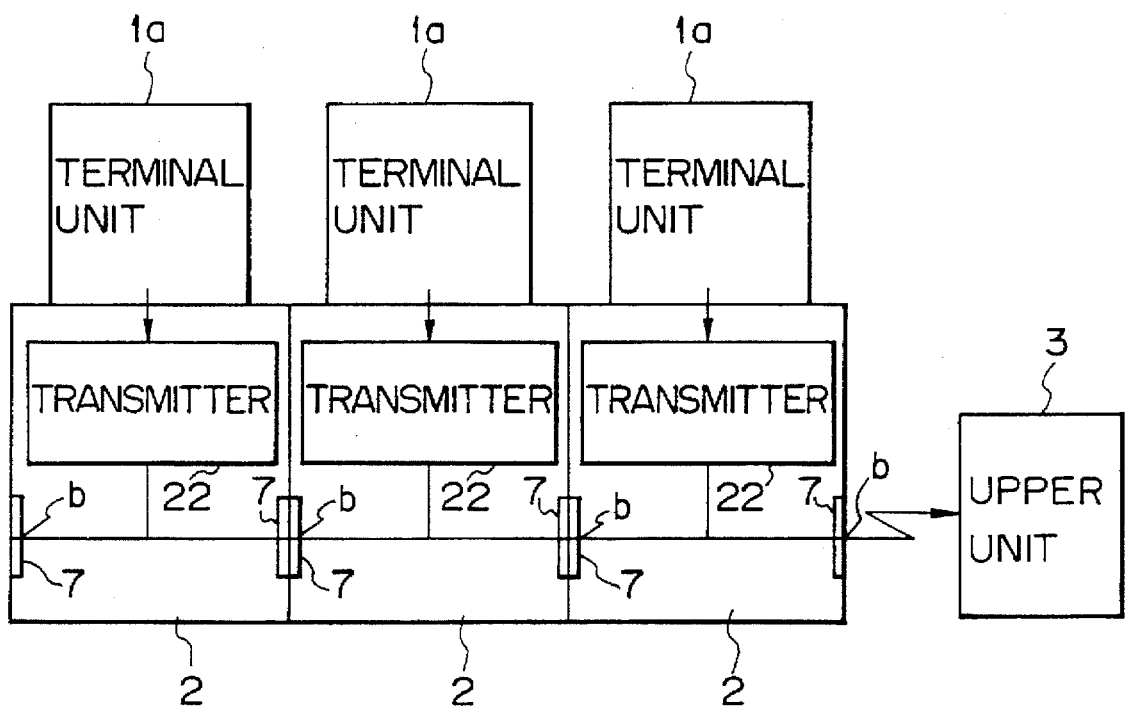
FIG. 7 is a block diagram showing the principle of the first aspect of the present invention.

FIG. 7 shows a principle construction diagram of a data transmission system according to an embodiment of the present invention.

In the figure, the data transmission system includes a plurality of data transmission units 2 such as communication interface units CIUs. Each of the data transmission units 2 can be connected to a movable terminal unit 1a such as a hand-held computer HHC. When the movable terminal unit 1a is mounted on the data transmission unit 2, data stored in the movable terminal unit 1a is transmitted form the data transmission unit 2 to an upper unit 3 such as a host computer, or data is transmitted from the upper unit 3 through the data transmission unit to the movable terminal unit 1a. Each of the data transmission units 2 includes couplers 7 for directly coupling the data transmission unit 2 to a front stage data transmission unit and/or a rear stage data transmission unit without using a connecting cable. Each of the couplers 7 includes a data pin (b) for passing data from one of the movable terminal unit 1a and the front stage data transmission unit to one of the rear stage data transmission units and the upper unit 3.

By the above construction, the movable terminal units 1a are respectively connected to a plurality of data transmission terminals 2a. One of the plurality of the data transmission units 2a that are connected to each other by the couplers 7 is connected to the upper unit 3 so that the data stored in respective terminal units 1a are sequentially transmitted from the data transmission unit 2a connected to the upper unit 3.

When a plurality of data transmission units 2a, to which the movable terminal units 1a are respectively connected, are coupled in series by the couplers 6, each data transmission unit is connected to its front stage or to its rear stage, and one of the data transmission units 2a is connected to the upper unit 3. When the data stored in each movable terminal unit 1a is transmitted, the transmitting data is sequentially transmitted from the data transmission unit 2 connected to the upper unit 3. Therefore, when a plurality of data transmission units 2a are to be connected to the upper unit 3 by, for example, a connection cord, only a single connecting cord is necessary. Thus, it is not necessary to connect same using a plurality of connection cords, or replace the connection thus making the operation simple and avoiding a congestion of connection cords. In addition, since the adjacent data transmission units 2a are directly coupled by the coupler 7, there is no space between the adjacent data transmission units 2a thus reducing the area for placing the data transmission units.

Figure 8:
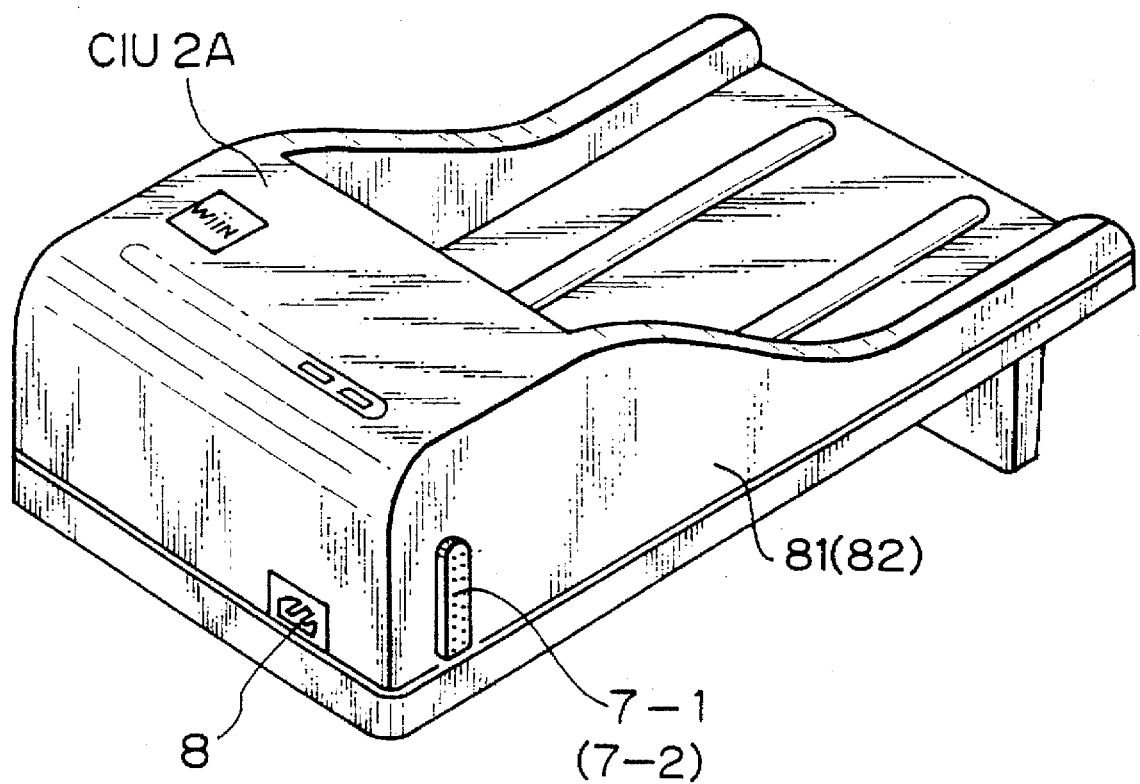
FIG. 8 is a perspective view showing a communication interface unit according to an embodiment of the present invention.

FIG. 8 is a perspective view of a communication interface unit 2A as an example of the data transmission unit, according to an embodiment of the present invention. In FIG. 8, the data transmission unit 2A has side surfaces 81 and 82 opposite each other. The couplers 7 on both side surfaces are a convex connector 7-1 and a concave connector 7-2. The convex connector 7-1 and the concave connector 7-2 include data pins. The convex connector 7-1 is adapted to be coupled to a convex connector of the front stage data transmission unit, and the concave connector 7-2 is adapted to be coupled to a convex connector of the rear stage data transmission unit.

Figure 9:
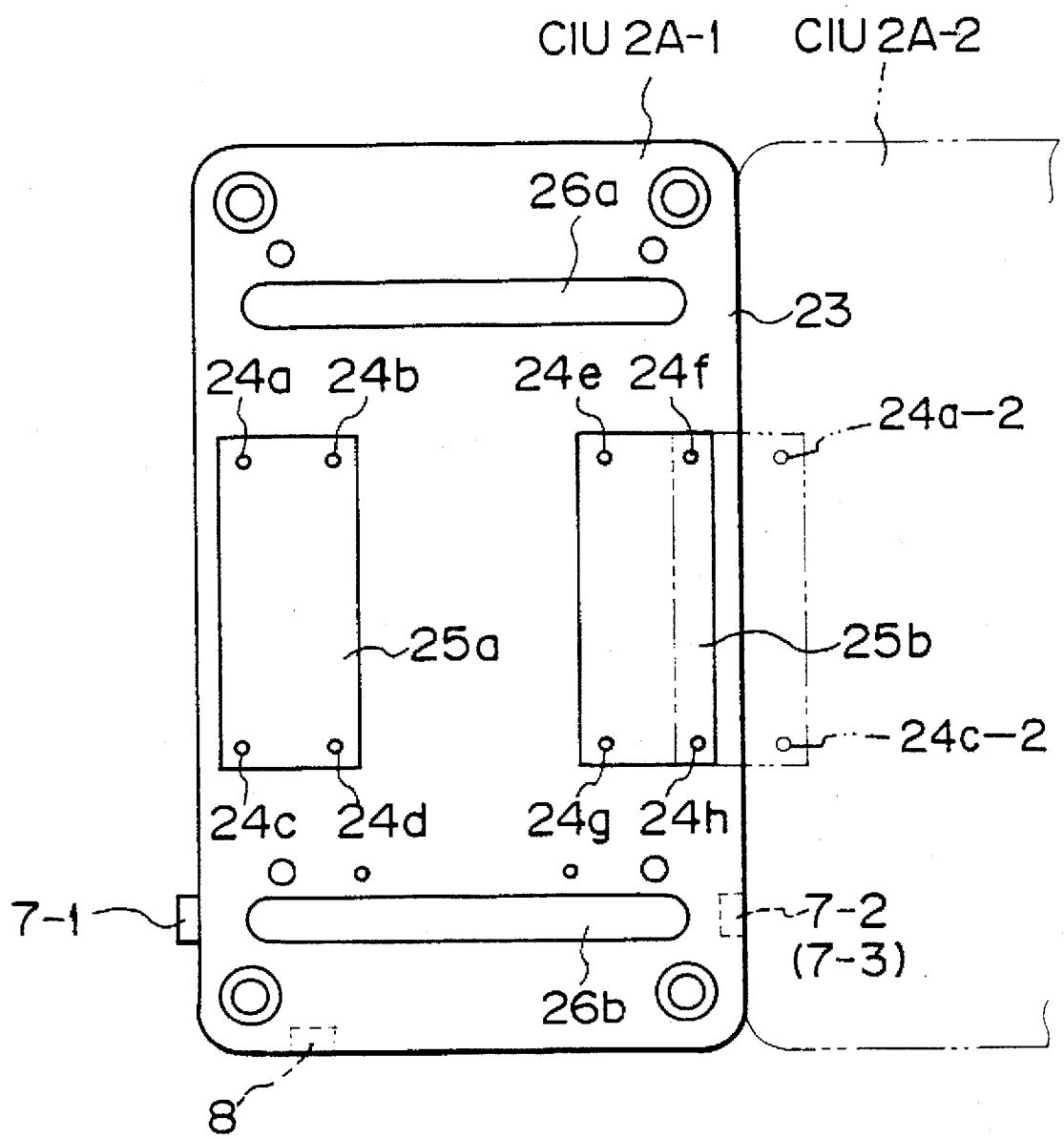
FIG. 9 is a diagram showing a bottom surface of the communication interface unit shown in FIG. 8, according to an embodiment of the present invention.

FIG. 9 is a bottom view of the communication interface units 2A-1 and 2A-2 coupled together. As shown in FIG. 9, the CIU 2A-1 includes a bottom plate 23. Two coupling plates 25a and 25b provided on the bottom surface 23. The coupling plate 25a is used to fasten the coupling between the CIU 2A-1 and the CIU 2A-2 which is a rear stage CIU of the CIU 2A-1. The coupling plate 25b is used to fasten the coupling between the CIU 2A-1 and the front stage CIU thereof.

In FIG. 9, tapped holes 24a to 24d and 24e to 24h are provided at positions close to the sides of the bottom surface 23 so that the coupling plates 25a and 25b are fixed by screws in the tapped holes 24a to 24d and 24e to 24h. Namely, the tapped holes 24a to 24d and 24e to 24h are provided at positions so that, when the CIU 2A-1 is to be coupled to another CIU 2A-2 for example, the coupling between the convex coupler 7-1 of the CIU 2A-1 and a concave coupler of the CIU 2A-2 can be fastened by removing the coupling plate 25b and then fixing the coupling plate 25b by the screws fitted into tapped holes 24f, 24h, 24a-2 and 24c-2. In the figure, only the coupling plate 25b is moved as illustrated by a dash-two dots line.

Also, foot attachment part 26a and 26b respectively have tapped holes not shown. The foot attachment part 26a attaches a not-shown foot when the CIU 2A-1 is used by placing it on a table, and the foot attachment part 26b attaches the foot when the CIU is placed on a wall, by screwing same.

When a plurality of the CIUs are directly coupled in series by the couplers, only the left-most or the right-most CIU is directly coupled to the upper unit 3. Alternatively, one of the CIUs may be connected to the upper unit 3 through a data cable.

Figure 10:
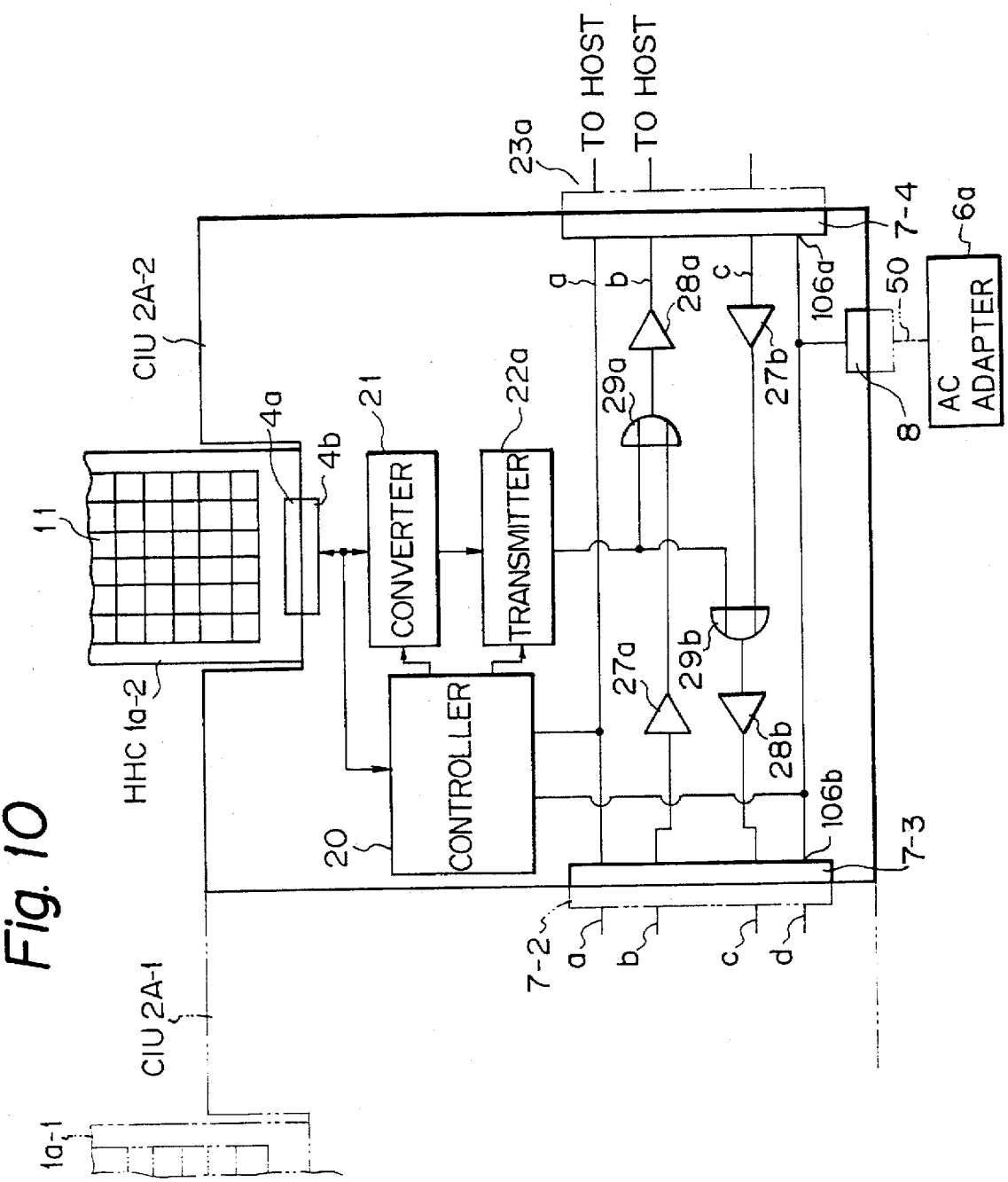
FIG. 10 is circuit diagram showing the circuit construction of the communication interface unit according to an embodiment of the present invention.

FIG. 10 is a block diagram showing the circuit construction of the CIU 2A-2. In the figure, elements 27a and 27b, and 28a and 28b are receivers and drivers for wave forming, and elements 29a and 29b are OR circuits. The CIU 2A-2 includes a convex coupler 7-3 and a concave coupler 7-4. To the couplers 7-3 and 7-4, input/output terminals for transmitting data, a power supply terminal and so forth are connected. Namely, in the figure, (a) is a command line through which a notification to the host 3a and a command from the host 3a pass, (b) and (c) are transmission lines through which transmitting data pass, and (d) is a power supply line.

Here, the transmission line (b) is the one for the transmitting data of the CIUs 2A-1 and 2A-2 when the CIU 2A-2 is connected to the CIU 2A-1 and the connecting cord 23a is connected to the coupler 7-4 of the CIU 2A-2, and the transmission line (c) is the line for transmitting data of the CIU 2A-2 when the connecting cord 23a is connected to the coupler 7-2 (the coupler opposite the coupler 7-3) of the CIU 2A-1.

By the above construction, when, for example, the CIU 2A-2 is connected to the CIU 2A-1 and when the HHCs 1a and 1b are mounted to same respectively, as shown in a dash-two dots line in FIG. 10, the coupler 7-2 of the CIU 2A-1 is connected to the coupler 7-3 in the CIU 2A-2, and as shown in FIG. 9, when the bottom parts are coupled by the coupling plates 25a and 25b, the corresponding transmitting data input/output terminals, power supply terminals, and so forth in the CIUs 2A-1 and 2A-2 are connected to each other.

Also, a power supply connecting cord 50 is connected to the power supply connector 8, and a connecting cord 23a for transmission is connected to the coupler 7-4 of the CIU 2A-2. By the connection of the power connecting cord 50, the power supply for the CIU 2A-2 and the CIU 2A-1 become common via the power supply line (d).

The coupler 7-3 of the CIU 2A-2 includes a power supply pin 106b adapted so as to be connected to a power supply pin of the front stage CIU 2A-1. The coupler 7-4 of the CIU 2A-2 includes a power supply pin 106a adapted to be connected to a power supply pin of one of the upper units 3 or to the rear stage CIU (not shown in FIG. 10), for passing a power supply current.

The power supply connector 8 is adapted to connect a power supply adapter 6a for generating a power supply current to the power supply pins.

Next, when the HHCs 1a-1 and 1a-2 are mounted on the CIUs 2A-1 and 2A-2 respectively, and are directly coupled, the fact of the connection is imparted via the command line (a) and the CIUs 2A-1 and 2A-2 to the upper unit 3, which is a host computer such as a personal computer.

Then, from the host computer 3, first, a data transmission instruction is output to the HHC 1a-2 so that the data stored in the HHC 1a-2 is converted into light data, as explained in the prior art example, and is transmitted to the CIU 2A-2, where it is converted to transmitting data by the converter 21. Then the data transmission instruction is transmitted by the transmitting unit 22a via the OR circuit 29a of the transmission line (b), the driver 28a, and the connecting cord 23a.

When the data transmission from the HHC 1a-2 is completed, a data transmission instruction is output from the host computer 3 to the HHC 1a-1 so that the data stored in the HHC 1a-1 is converted into light data and is transmitted to the CIU 2A-1 where it is converted into transmitting data, which is transmitted from a not-shown transmitting unit through the transmission line (b), the couplers 7-2 and 7-3, the transmission line (b) of the CIU 2A-2, and the connecting cord 23a.

Thus, when the data stored in a plurality of HHCs is to be transmitted by mounting same on the corresponding CIUs, the connection to the host computer 3 can be performed by a single connection cord 23a. The connection to the power supply can be made by the single power supply connecting cord 50, which is common for the respective CIUs, by providing the transmission lines (b) and (c) and the couplers that connect the power supply line (d) to the power supply connecting cord 50.

Accordingly, the excessive labor required to connect a plurality of connecting cords to respective CIUs 2A-1 and 2A-2 individually or replacement thereof is eliminated. Also, the congestion of connecting cords can be prevented. Therefore, it is very convenient when the number of HHCs and CIUs to be used is increased in accordance with an increase of data to be handled.

The present invention is not restricted to the above described embodiment with reference to FIG. 10. Instead of connecting the output of the transmitting unit 22a to the OR circuits 29a and 29b, the output of the converter 21 may alternatively be connected to the OR circuits 29a and 29b, when the transmitting unit 22a is not provided in each CIU. Further, alternatively, the data line from the connector 4b may be directly connected to the OR circuits 29a and 29b when the converter 21 and the transmitting unit 22a are not provided in each CIU.

Also, in the above example, an explanation was provided for the case when only two of the CIUs 2A-1 and 2A-2 are coupled, however, three or more may of course be coupled in series. In this case, the connecting cord 23a and the power connecting cord 50 may be connected to any one of the CIUs placed at the end position or at the intermediate position, thereby resulting in a similar effect.

Further, in the above example, an explanation was provided in which, when the HHCs 1a-1 and 1a-2 are mounted, the fact is imparted to the host computer 3, and data is transmitted from the HHCs 1a-1 and 1a-2 by a data transmission command from the host computer 3, however, another method may also be possible. For example, by sequentially pressing the transmission buttons on the operation panels 11 of the HHCs 1a-1 and 1a-2 mounted on the CIUs 2A-1 and 2A-2, data may be transmitted.

According to another embodiment of the present invention, when a plurality of the CIUs are directly coupled in series by the couplers, or indirectly connected in series through connecting cables, only one power supply adapter 6a is connected to the power supply connector in one of the CIUs. The other CIUs are supplied with the power supply current from the power supply adapter 6a.

Figure 11:
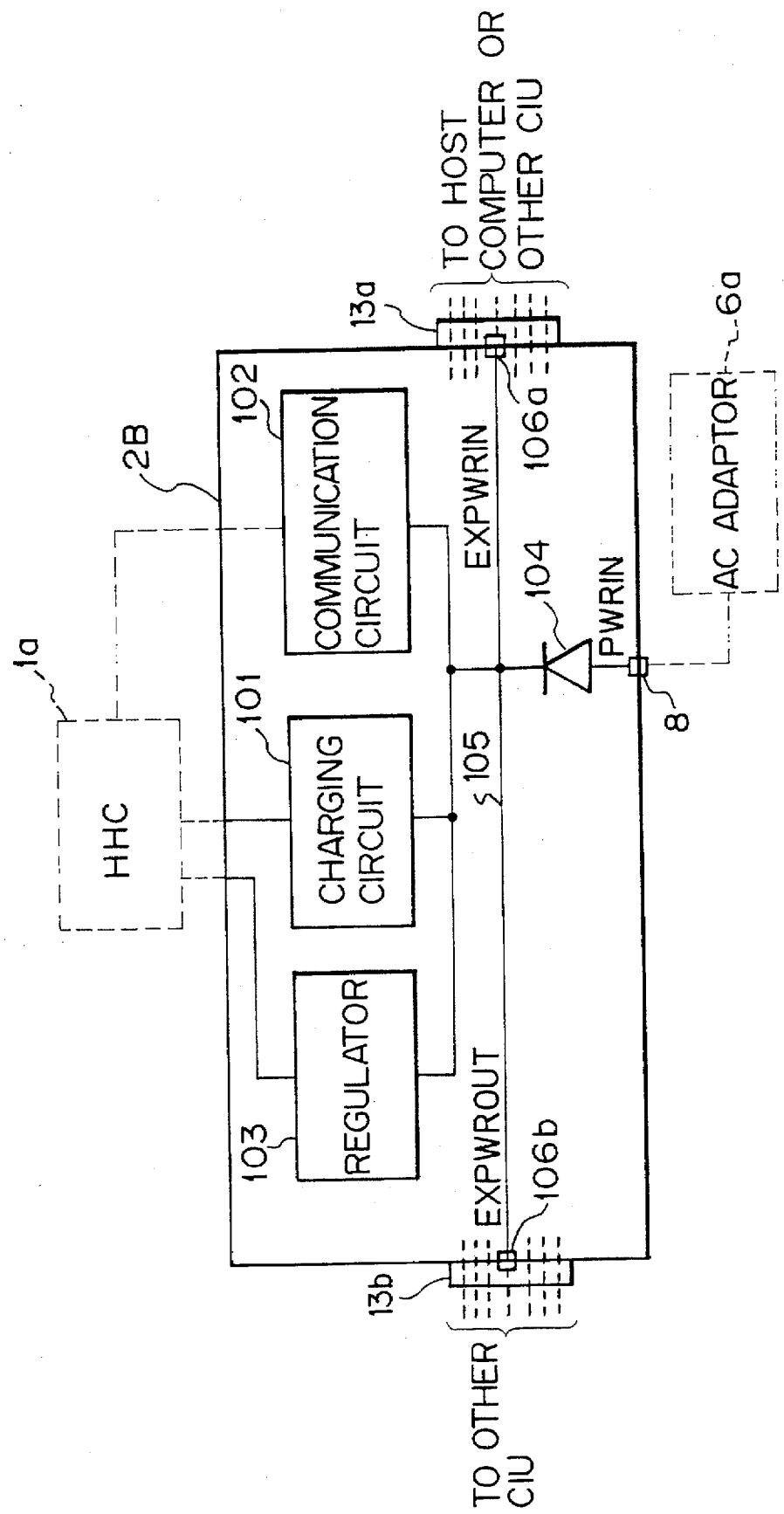
FIG. 11 is a diagram showing a communication interface unit according to another embodiment of the present invention.

FIG. 11 is a principle construction diagram of this embodiment. In FIG. 11, a communication interface unit (CIU) 2B comprises external connectors 13a and 13b for delivering data between a host computer or other communication interface units connected to said connectors and a hand-held computer 1a. Between the external connector 13a and another external connector of another communication interface unit or the host computer, a connection data cable is connected. The external connectors 13a and 13b may alternatively be the same as the couplers 7-1 and 7-1 for direct coupling as in the previously described embodiment shown in FIG. 9.

The hand-held computer 1a can be inserted into the communication interface unit 2B to receive a charging current from a charging circuit 101.

According to this embodiment of the present invention, as shown in FIG. 11, the external connectors 13a and 13b are provided with current supplying pins 106a and 106b, to which a charging circuit 101 for charging the hand-held computer 1a, a voltage regulator for converting a voltage applied by an AC adapter 6a into a voltage suitable for driving the hand-held computer 1a, and a communication circuit 102 are connected through a power supply line 105.

Further, a reverse current preventing diode 104 is connected between the power supply line 105 and the power supply connector 8, to prevent a reverse current to be conducted from one of said power supply pins to the power supply connector 8.

When the AC power supply adapter 6a is connected to the power supply connector 8 in the communication interface unit 2B, the current from the power supply adapter 6a is separated into a current that is supplied to the main body of the communication interface unit 2B and currents that are flowing through the current supplying pins 106a and 106b to the adjacent communication interface units. The charging current for the hand-held computer 1a is supplied from the power supply adapter 6a through the diode 104 to the charging circuit 101, by which the charging of the hand-held computer 1a is carried out.

When the communication interface unit 2B is in a multiple connection configuration by connecting another communication interface unit to the external connector 13a or 13b, it is not always necessary to connect a power supply adapter 6a to each communication interface unit. The power supply adapter 6a may be connected to only one of the communication interface units, according to the embodiment of the present invention. In this case, the charging current is supplied from another communication interface unit through the current supplying pin 106a or 106b in the external connector 13a or 13b.

In FIG. 11, PWRIN represents a power input from the AC power supply adapter 6a, and EXPERIN and EXPWOUT respectively represent input and output currents from the current supplying terminals 106a and 106b provided in the external connectors 13a and 13b.

When the AC adapter 6a is connected to the power supply connector 8, the power input PWRIN is supplied through the diode 14 to the charging circuit 101, the communication circuit 102, and the voltage regulator 103 in the main body of the communication interface unit 2B, and is also sent to the current supplying pins 106a and 106b through the power supply line 105. On the other hand, when the power supply adapter 6a is not connected to this communication interface unit 2B, and when the power supply adapter 6a is connected to the other communication interface unit that is connected in multiple connection, the current from the current supplying pin 106a or 106b is supplied to the charging circuit 101, the communication circuit 102, and the voltage regulator 103.

Instead of providing a single current supplying pin 106a or 106b, a plurality of sets of current supplying pins may be provided when the amount of current is so large that a single pin cannot stand the current.

Figure 12:
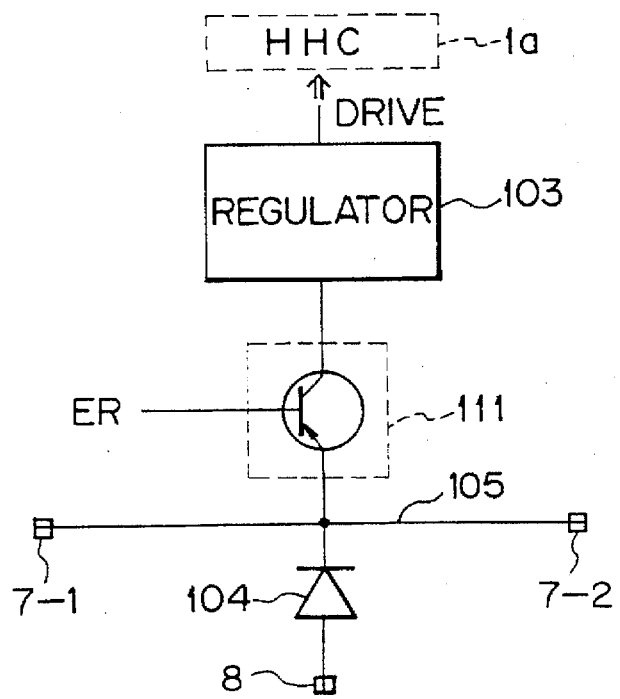
FIG. 12 is a circuit diagram showing a switching transistor connected between the power supply line and a voltage regulator, according to still another embodiment of the present invention.

According to still a further embodiment of the present invention, as shown in FIG. 12, a switch 111 is provided between the power supply line 105 and the voltage regulator 103. The switch 111 is ON only when the hand-held computer 1a inserted into the communication interface unit 2B is in a state of communication, and is OFF when it is not in a state of communication. When, for example, an ER signal defined in the RS232C interface is at a high level, the HHC 1a is in a state of communication. Namely, the transistor 111 is controlled in accordance with the presence or absence of the ER signal. Thus, with a simple circuit construction, supplying a driving current can be efficiently carried out only on the hand-held computer under communication.

Thus, according to the embodiment of the present invention shown in FIG. 11, the current supplying pins 106a and 106b are provided in the external connectors 13a and 13b that accommodate not only the data signal and the command signal but also the charging and driving current, so that it is possible to supply a current to the other communication interface units, or to receive a current from the other communication interface units, through the external connector 13a or 13b. Accordingly, when the communication interface units 2B are in a multiple-connection configuration, and when the power supply adapter 6a is inserted into one of the communication interface units 2B, the power is efficiently supplied with a voltage drop only across the diode 14, regardless of the number of communication interface units 2B.

Also, as shown in FIG. 12, by providing a switch 111, the driving current is supplied only to the communication interface unit 2B under communication so that power can be saved.

Figure 13:
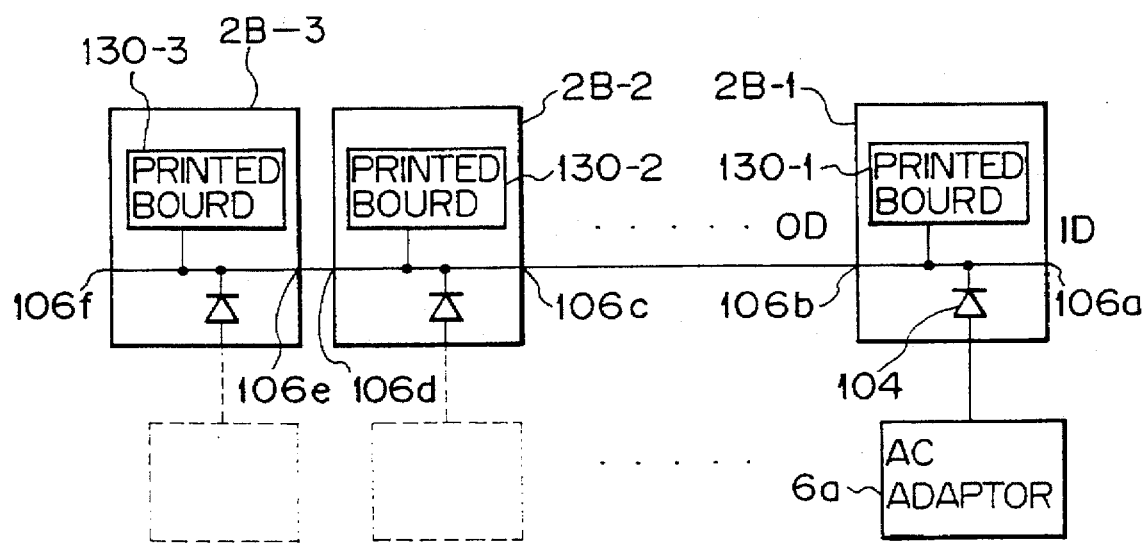
FIG. 13 is a block diagram showing communication interface units connected in series in a multiple connection, according to an embodiment of the present invention.

FIG. 13 is a block diagram of the communication interface units in multiple configuration, according to the above described embodiment of the present invention. In the figure, 130-1 to 130-3 are printed boards of the main body of the communication interface units 2B-1 to 2B-3, in each of which the charging circuit 101, the communication circuit 102, and the voltage regulator 103 are provided.

When the communication interface units 2B-1 to 2B-3 are connected in multiple connection as shown in FIG. 13, the power supply adapter 6a may be inserted into any one of the communication interface units. Even when another power supply adapter is erroneously inserted into another unit, a reverse current to the power supply adapter 6a can be prevented by the function of the reverse current preventing diode 104. The AC power supply adapter 6a, by nature, conducts currents in accordance with the applied loads, and therefore, has a mechanism to conduct a current, the amount of which corresponds to the number of connected communication interface units.

When a large capacity power supply adapter, which can always supply a current to a plurality of communication interface units, must be used, and when it is used for a single communication interface unit, it will be excessively heavy and large, making it inconvenient. Accordingly, it is convenient if two types, i.e., a low-price small-size single-use power supply adapter and multiple-use power supply adapter, can be used separately to drive the communication interface units, by, for example, making a DC plug common.

To this end, according to still a further embodiment of the present invention, a large capacity power supply adapter (which is referred to as a multiple-use power supply adapter), and also a low-price small-scale power supply adapter (which is referred to as a single-use power supply adapter) having an ability to supply a charging current to only one communication interface unit 2B can be used, and, when the single-use power supply adapter is used in a multi-connection configuration, in which a plurality of communication interface units 2B are connected, the configuration must be such that it can prevent a fault owing to insufficient power during a charging or a data transfer.

To realize the configuration, as the adapter connecting terminal 8, a power supply of the single-use power supply adapter and a power supply of the multiple-use power supply adapter, for supplying a charging current to a plurality of communication interface units 2B, are preferably provided separately. The inserting portions of the plugs for connecting the power supply adapters may alternatively be common, in view of the available space.

If the plug inserting portions are made to be common for single-use and multiple-use adapters, and when a plurality of communication interface units are to be driven, if the single-use power supply adapter is erroneously inserted, there is a possibility that a fault will occur in the charging or data transfer because of insufficient power. Therefore, it is necessary to provide a means for preventing the erroneous insertion of the single-use power supply adapter when a plurality of communication interface units are to be driven, or to provide a means for recognizing that the single-use power supply adapter is erroneously inserted into the communication interface unit and for preventing a fault in a charging or a data transfer.

Figure 14:
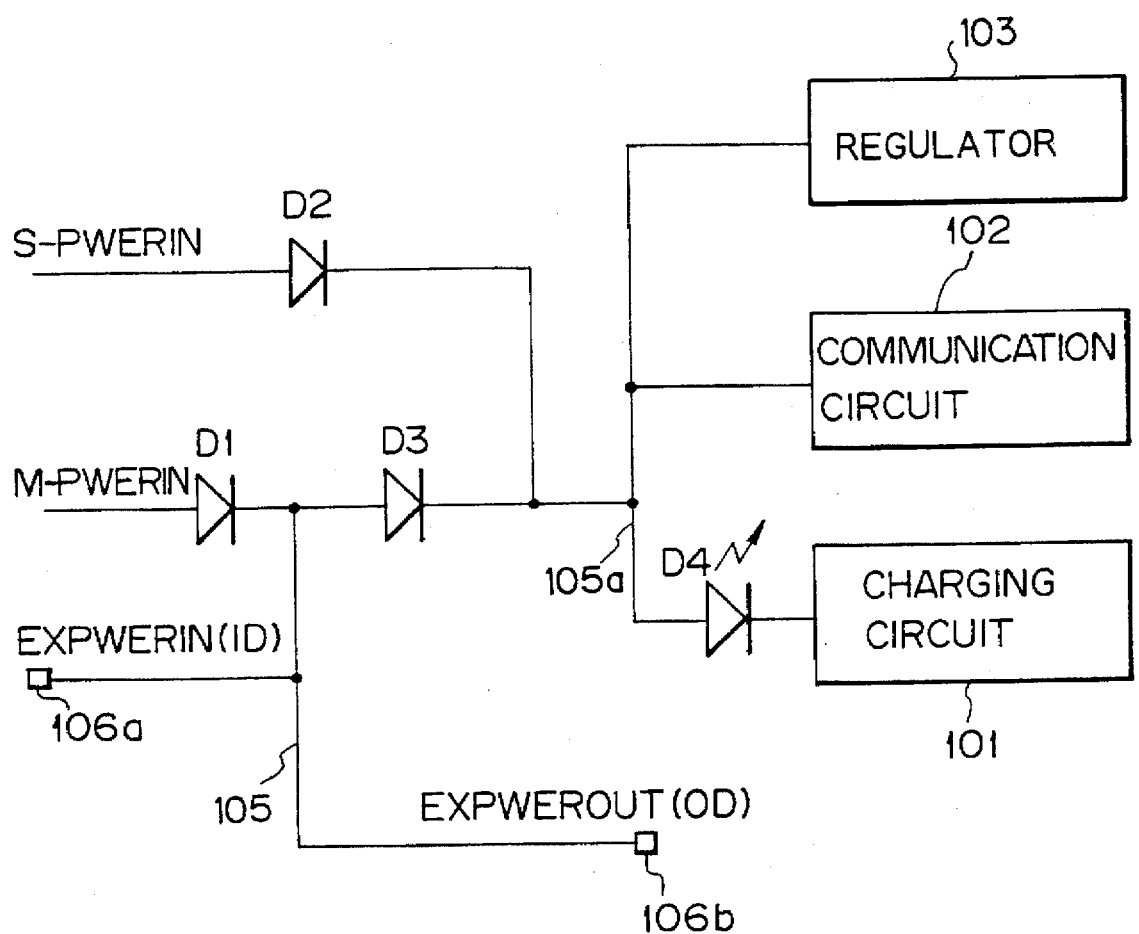
FIG. 14 is a circuit diagram of a power supply part in a communication interface unit, according to still another embodiment of the present invention.

To distinguish between a single-use power supply adapter and a multiple-use power supply adapter without being recognized by the user, and to protect the communication interface unit when the power supply adapter is erroneously used, the power supply part in the communication interface unit is made to have a circuit construction, for example, as shown in FIG. 14.

In FIG. 14, S-PWERIN represents a power input from a single-use power supply adapter; M-PWERIN represents a power input from a multiple-use power supply adapter; EXPWERIN and EXPWEROUT respectively represent input/output currents from the current supplying pins 106a and 106b of the ID connector 13a and the OD connector 13b.

D1–D3 are reverse current preventing diodes, and D4 is a light emitting diode used as a charging lamp indicating that the unit is being charged. The anode of the diode D2 is connected to the S-PWERIN, and the cathode thereof is connected to the anode of the LED D4, to the communication circuit 102, and to the voltage regulator 103. The anode of the diode D1 is connected to the M-PWERIN, and the cathode thereof is connected to the anode of the diode D3, and to the current supplying pins 106a and 106b. The cathode of the diode D3 is connected to the cathode of the diode D2. The cathode of the LED D4 is connected to the charging circuit 101.

When the current from the S-PWERIN is supplied, the current is supplied through the diode D2 to the charging circuit 101, the communication circuit 102, and the voltage regulator 103. The current from the S-PWERIN does not flow through the diode D3 so that the single-use current is not supplied to the current supplying pins 106a and 106b.

When the current from the M-PWERIN is supplied, the current is supplied through the diodes D1 and D3 to the charging circuit 101, the communication circuit 102, and the voltage regulator 103, as well as through the diode D1 to the current supplying pins 106a and 106b. Therefore, the other communication interface units are supplied with the current.

Power inputs from the S-PWERIN and M-PWERIN are connected to one power supply line 105a on a printed board of the communication interface unit 2B.

By this arrangement, when the single-use power supply adapter is inserted, the current does not flow into the current supplying pins 106a and 106b because of the operation of the diode D3. Therefore, even when the single-use power supply adapter is erroneously inserted in multiple connection, the current is supplied to only the hand-held computer that is inserted into the communication interface unit, into which the adapter is inserted, and the flow of current to the other units can be prevented. When the charging current flows into the charging circuits 101, the light emitting diode D4 lights up so that it is immediately recognized at a glance that the hand-held computer is being charged.

When a multiple connection is used, and when the single-use power supply adapter is erroneously inserted, the user can easily recognize it as an error because the charging lamp (light emitting diode D4) is not lit.

Figure 15:
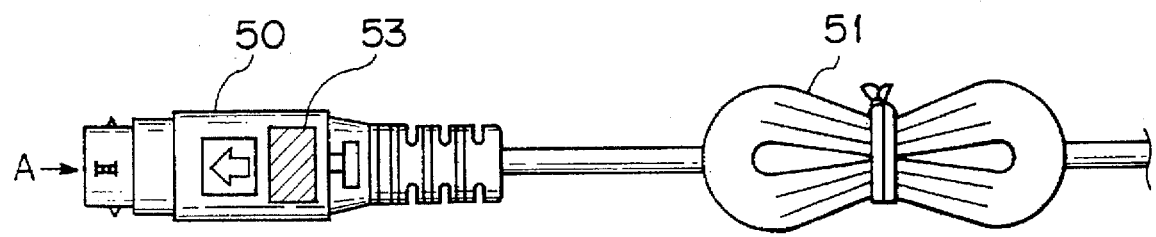
FIG. 15 is a side view of a DC plug adapted to be inserted into a power supply connector in the communication interface unit shown in FIG. 14.

FIG. 15 is a side view of a DC plug adapted so as to be inserted into the connector 8. In FIG. 15, 50 is a DC plug that connects the power supply adapter 6a to the communication interface unit 2B through the connector 8, and 51 is an adapter connecting code.

Figure 16:
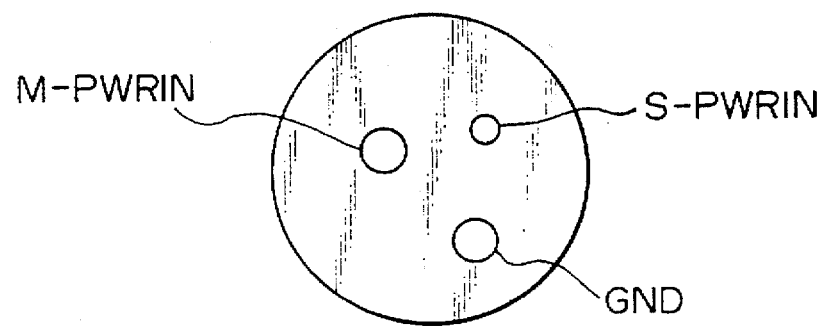
FIG. 16 is an end view of the power supply connector adapted to receive the DC plug shown in FIG. 15.

FIG. 16 is a expanded end surface view of the inserting portion of the plug 50 shown in FIG. 15 when it is seen from a direction A. As shown in FIG. 16, the DC plug 50 used in the present embodiment has three pins, i.e., one for a ground line GND, one for a single-use power supply line (for S-PWERIN), and one for a multiple-use power supply line (for M-PWERIN). When the plug 50 is used as a single-use power supply plug, the pin for the ground line GND and the pin for the single-use power supply line are respectively connected to the ground line and the single-use power supply line. When the plug 50 is used as a multiple-use power supply plug, the pin for the ground line GND and the pin for the multiple-use power supply line are respectively connected to the ground line and the multiple-use power supply line. The user need not recognize whether the plug is a single use or a multiple use plug.

Although the user need not recognize the type of plug 50 when the circuit shown in FIG. 14 is used, it may be convenient to be able to visually distinguish the type of plug when the reverse current preventing diode D3 is not provided in the communication interface circuit 2B. When the DC plug 50 for the power supply adapter is made common for single-use and multiple-use, discrimination thereof is impossible. To distinguish the type of plug visually, a flag may be provided on the plug 50 for discriminating between single-use and multiple-use. Alternatively, by directly printing or affixing a seal on the plug 50, as shown in FIG. 15, a type describing part 53 is provided to distinguish between a single-use and a multiple-use adapter.

As described above, according to the present invention, since adjacent communication interface units are directly coupled without using a connecting cord, space between adjacent communication interface units can be saved. Further, since one of the communication interface units is connected to a host computer, a number of connecting cords between the communication interface units and the host computer can is not necessary, making the handling of the connecting cords very convenient. Further, even when a plurality of communication interface units are connected by providing, in external connectors of the communication interface units, pins for conducting charge currents, the power can be supplied from a single power supply adapter to all of the communication interface units. Accordingly, the inconvenience of connecting the power supply adapters can be eliminated and space can be saved. Further, by supplying a charging current only to the communication interface unit that is being used in multiple connection, power can be saved.

In addition, an inexpensive and compact single-use power supply adapter and a large capacity multiple-use power supply adapter can be used separately and, even when the single-use power supply adapter is erroneously inserted in a multiple connection configuration, recognition thereof and protection of the unit can be assured.

We claim:

1. A data transmission unit for transmitting data stored in a movable terminal unit to a host computer when said movable terminal unit is connected to said data transmission unit and for being coupled to at least one of a front stage data transmission unit and a rear stage data transmission unit, said data transmission unit comprising:

coupling means for directly coupling said data transmission unit to the at least one of a front stage data transmission unit and a rear stage data transmission unit without using a connecting cable, said coupling means comprising data pins for passing data from one of said movable terminal unit and said front stage data transmission unit to one of said rear stage data transmission unit and said host computer, said coupling means comprising power supply pins connected to a power supply pin of said front stage data transmission unit and to a power supply pin of one of said host computer and said rear stage data transmission unit, for transmitting a power supply current, a power supply line being coupled between said power supply pins;

a power supply connector separately provided from said coupling means and connecting a power supply adapter, generating power supply current, to said power supply pins;

reverse current preventing means connected between said power supply pins and said power supply connector, for preventing a reverse current from being conducted from one of said power supply pins to said power supply connector;

a charging circuit, connected to the power supply line, for charging said movable terminal unit;

a communication circuit, connected to the power supply line, for carrying out communication between said movable terminal unit and said host computer;

a voltage regulator, connected to the power supply line, for converting the voltage at said power supply line into a voltage suitable for driving said movable terminal unit; and switching means connected between said power supply line and said voltage regulator, for conducting said power supply current to said voltage regulator only when said data transmission unit is transmitting.

2. A data transmission unit for transmitting data stored in a movable terminal unit to a host computer when said movable terminal unit is connected to said data transmission unit and for being coupled to at least one of a front stage data transmission unit and a rear stage data transmission unit, said data transmission unit comprising:

coupling means for directly coupling said data transmission unit to the at least one of a front stage data transmission unit and a rear stage data transmission unit without using a connecting cable, said coupling means comprising data pins for passing data from one of said movable terminal unit and said front stage data transmission unit to one of said rear stage data transmission unit and said host computer, said coupling means comprising power supply pins connected to a power supply pin of said front stage data transmission unit and to a power supply pin of one of said host computer and said rear stage data transmission unit, for transmitting a power supply current, a power supply line being coupled between said power supply pins;

a power supply connector separately provided from said coupling means and connecting a power supply adapter, generating power supply current, to said power supply pins; and reverse current preventing means connected between said power supply pins and said power supply connector, for preventing a reverse current from being conducted from one of said power supply pins to said power supply connector, said reverse current preventing means comprising:

a second reverse current preventing diode connected between said multiple-use power supply terminal and said power supply line for preventing a reverse current from flowing from said power supply line to said multiple-use power supply terminal, and a third reverse current preventing diode connected between said single-use power supply terminal and said power supply line through said first reverse current preventing diode for preventing a reverse current from flowing from said power supply line to said single-power supply terminal.

3. A data transmission unit for transmitting data stored in a movable terminal unit to a host computer when said movable terminal unit is connected to said data transmission unit and for being coupled to at least one of a front stage data transmission unit and a rear stage data transmission unit, said data transmission unit comprising:

coupling means for connecting said data transmission unit to the at least one of a front stage data transmission unit and a rear stage data transmission unit through connecting cables, said coupling means comprising:

data pins for passing data from one of said movable terminal unit and said front stage data transmission unit to one of said rear stage data transmission unit and said host computer, and power supply pins adapted to be connected to one of the power supply pins of said front stage data transmission unit and to one of the power supply pins of one of said host computer and said rear stage data transmission unit, for conducting power supply current;

a power supply connector separately provided from said coupling means and connecting a power supply adapter, generating said power supply current, to said power supply pins;

reverse current preventing means connected between said power supply pins and said power supply connector, for preventing a reverse current from being conducted from one of said power supply pins to said power supply connector;

a power supply line provided between said power supply pins;

a charging circuit, connected to said power supply line, for charging said movable terminal unit;

a communication circuit, connected to said power supply line, for carrying out communication between said movable terminal unit and said host computer;

a voltage regulator, connected to said power supply line, for converting the voltage at said power supply line into a voltage suitable for driving said movable terminal unit; and switching means connected between said power supply line and said voltage regulator, for conducting said power supply current to said voltage regulator only when said data transmission unit is transmitting.

4. A data transmission unit as claimed in claim 3, wherein said power supply connector comprises:

a single-use power input terminal, connected to said communication circuit, for receiving a small amount of power for driving only a single data transmission unit, a multiple-use power input terminal for receiving a large amount of power for driving a plurality of data transmission units, and a first reverse current preventing diode connected between said power supply pins and said single-use power input terminal, for preventing a reverse current from flowing from said single-use power supply terminal to said power supply pins, said multiple-use power supply terminal being connected through said first reverse current preventing diode to said communication circuit.

5. A data transmission unit for transmitting data stored in a movable terminal unit to a host computer when said movable terminal unit is connected to said data transmission unit and for being coupled to at least one of a front stage data transmission unit and a rear stage data transmission unit, said data transmission unit comprising:

coupling means for connecting said data transmission unit to the at least one of a front stage data transmission unit and a rear stage data transmission unit through connecting cables, said coupling means comprising:

data pins for passing data from one of said movable terminal unit and said front stage data transmission unit to one of said rear stage data transmission unit and said host computer, and power supply pins adapted to be connected to one of the power supply pins of said front stage data transmission unit and to one of the power supply pins of one of said host computer and said rear stage data transmission unit, for conducting power supply current; and a power supply connector separately provided from said coupling means connecting a power supply adapter, generating said power supply current, to said power supply pins, said reverse current preventing means comprising:

a second reverse current preventing diode connected between said multiple-use power supply terminal and said power supply line for preventing a reverse current from flowing from said power supply line to said multiple-use power supply terminal, and a third reverse current preventing diode connected between said single-use power supply terminal and said power supply line through said first reverse current preventing diode for preventing a reverse current from flowing from said power supply line to said single-power supply terminal.

6. A data transmission unit for transmitting data stored in a movable terminal unit to a host computer when said movable terminal unit is connected to said data transmission unit and for being coupled to at least one of a front stage data transmission unit and a rear stage data transmission unit, said data transmission unit comprising:

coupling means for directly coupling said data transmission unit to the at least one of a front stage data transmission unit and a rear stage data transmission unit without using a connecting cable, said coupling means comprising data pins for passing data from one of said movable terminal unit and said front stage data transmission unit to one of said rear stage data transmission unit and said host computer, said coupling means comprising power supply pins connected to a power supply pin of said front stage data transmission unit and to a power supply pin of one of said host computer and said rear stage data transmission unit, for transmitting a power supply current, a power supply line being coupled between said power supply pins;

a communication circuit, connected to the power supply line, for carrying out communication between said movable terminal unit and said host computer;

a power supply connector separately provided from said coupling means and connecting a power supply adapter, generating power supply current, to said power supply pins, said power supply connector comprising:

a single-use power input terminal, connected to said communication circuit, for receiving a small amount of power for driving only a single data transmission unit, a multiple-use power input terminal for receiving a large amount of power for driving a plurality of data transmission units, and a first reverse current preventing diode connected between said power supply pins and said single-use power input terminal, for preventing a reverse current from flowing from said single-use power supply terminal to said power supply pins, said multiple-use power supply terminal being connected through said first reverse current preventing diode to said communication circuit; and reverse current preventing means connected between said power supply pins and said power supply connector, for preventing a reverse current from being conducted from one of said power supply pins to said power supply connector, said reverse current preventing means comprising:

a second reverse current preventing diode connected between said multiple-use power supply terminal and said power supply line for preventing a reverse current from flowing from said power supply line to said multiple-use power supply terminal; and a third reverse current preventing diode connected between said single-use power supply terminal and said power supply line through said first reverse current preventing diode for preventing a reverse current from flowing from said power supply line to said single-power supply terminal.

7. A data transmission unit for transmitting data stored in a movable terminal unit to a host computer when said movable terminal unit is connected to said data transmission unit and for being coupled to at least one of a front stage data transmission unit and a rear stage data transmission unit, said data transmission unit comprising:

coupling means for connecting said data transmission unit to the at least one of a front stage data transmission unit and a rear stage data transmission unit through connecting cables, said coupling means comprising:

data pins for passing data from one of said movable terminal unit and said front stage data transmission unit to one of said rear stage data transmission unit and said host computer, and power supply pins adapted to be connected to one of the power supply pins of said front stage data transmission unit and to one of the power supply pins of one of said host computer and said rear stage data transmission unit, for conducting power supply current, a power supply line being coupled between said power supply pins;

a communication circuit, connected to the power supply line, for carrying out communication between said movable terminal unit and said host computer;

a power supply connector separately provided from said coupling means and connecting a power supply adapter, generating said power supply current, to said power supply pins, said power supply connector comprising:

a single-use power input terminal, connected to said communication circuit, for receiving a small amount of power for driving only a single data transmission unit, a multiple-use power input terminal for receiving a large amount of power for driving a plurality of data transmission units, and a first reverse current preventing diode connected between said power supply pins and said single-use power input terminal, for preventing a reverse current from flowing from said single-use power supply terminal to said power supply pins, said multiple-use power supply terminal being connected through said first reverse current preventing diode to said communication circuit; and reverse current preventing means connected between said power supply pins and said power supply connector, for preventing a reverse current from being conducted from one of said power supply pins to said power supply connector said reverse current preventing means comprising:

a second reverse current preventing diode connected between said multiple-use power supply terminal and said power supply line for preventing a reverse current from flowing from said power supply line to said multiple-use power supply terminal, and a third reverse current preventing diode connected between said single-use power supply terminal and said power supply line through said first reverse current preventing diode for preventing a reverse current from flowing from said power supply line to said single-power supply terminal.

* * * * *